US008966431B2

(12) United States Patent
Bickford et al.

(10) Patent No.: US 8,966,431 B2
(45) Date of Patent: Feb. 24, 2015

(54) SEMICONDUCTOR TIMING IMPROVEMENT (71) Applicant: International Business Machines Corporation, Armonk, NY (US)

(72) Inventors: Jeanne P. Bickford, Essex Junction, VT (US); Howard B. Druckerman, Essex Junction, VT (US); Erik L. Hedberg, Essex Junction, VT (US); Joseph J. Oler, Jr., Jericho, VT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/683,228

(22) Filed: Nov. 21, 2012

(65) Prior Publication Data

US 2014/0143748 A1 May 22, 2014

(51) Int. Cl.
*G06F 17/50* (2006.01)
(52) U.S. Cl.
CPC .................................. *G06F 17/5045* (2013.01)
USPC ........................................................ 716/134
(58) Field of Classification Search
USPC ................................................. 716/134, 136
See application file for complete search history.

(56) References Cited

U.S. PATENT DOCUMENTS

| 7,460,922 | B1 | 12/2008 | Singh et al. |
| 7,653,888 | B2 | 1/2010 | Habib et al. |
| 7,848,907 | B2 | 12/2010 | Lu |
| 7,884,599 | B2 | 2/2011 | Habib et al. |
| 7,898,286 | B2 | 3/2011 | Arsovski et al. |
| 8,095,907 | B2 | 1/2012 | Bickford et al. |
| 8,131,056 | B2 | 3/2012 | Polonsky et al. |
| 8,187,897 | B2 * | 5/2012 | Cohn et al. ............... 438/8 |
| 2005/0235232 | A1 * | 10/2005 | Papanikolaou et al. ......... 716/1 |
| 2007/0089078 | A1 | 4/2007 | Engel et al. |
| 2009/0083690 | A1 | 3/2009 | Habib et al. |
| 2009/0327620 | A1 | 12/2009 | Arsovski et al. |

(Continued)

FOREIGN PATENT DOCUMENTS

WO 2005066791 7/2005

OTHER PUBLICATIONS

RD 489005, Jan. 10, 2005, Ho B. et al.

(Continued)

*Primary Examiner* — Thuan Do
*Assistant Examiner* — Mohammed Alam
(74) *Attorney, Agent, or Firm* — David Cain; Roberts Mlotkowski Safran & Cole, P.C.

(57) ABSTRACT

Approaches are provided for improving timing of new and existing semiconductor products. Specifically, a method is provided implemented in a computer infrastructure having computer executable code tangibly embodied on a computer readable storage medium having programming instructions operable to set starting across chip variation assumptions using design rules. The programming instructions are further operable to design a test chip and/or product chip using the starting across chip variation assumptions to close timing of the design. The programming instructions are further operable to place devices in the test chip and/or product chip. The programming instructions are further operable to compare performance of the devices within the test chip and/or the product chip to the starting across chip variation assumptions. The programming instructions are further operable to adjust the starting across chip variation assumptions based on the measured performance of the test chip and/or the product chip.

20 Claims, 5 Drawing Sheets

(56) References Cited

U.S. PATENT DOCUMENTS

| | | | |
|---|---|---|---|
| 2010/0044858 A1* | 2/2010 | Cohn et al. | 257/734 |
| 2010/0100856 A1* | 4/2010 | Mittal | 716/2 |
| 2010/0174503 A1 | 7/2010 | Balch et al. | |
| 2010/0304509 A1* | 12/2010 | Aghababazadeh et al. | 438/17 |
| 2010/0323462 A1 | 12/2010 | Anderson et al. | |
| 2011/0098838 A1 | 4/2011 | Culp et al. | |
| 2012/0010837 A1* | 1/2012 | Habitz et al. | 702/79 |
| 2013/0014075 A1* | 1/2013 | Habitz et al. | 716/136 |

OTHER PUBLICATIONS

Gattiker, A., "Using Test Data to Improve IC Quality and Yield", International Conference on Computer-Aided Design, IEEE, 2008, 7 pages.

Specification in U.S. Appl. No. 13/182,108, filed Jul. 13, 2011, 32 pages.

* cited by examiner

SEMICONDUCTOR TIMING IMPROVEMENT

FIELD OF THE INVENTION

The invention relates to systems and methods for integrated circuit ("IC") fabrication and optimization and, more particularly, to systems and methods for improving timing of new and existing semiconductor products.

BACKGROUND

Process variation is an increasingly important factor in the design of high yielding and high-performance ICs. Because the precise knowledge of variation is becoming an even more integral part of the design process as technology continues to scale, testing techniques are needed to extract, measure, and characterize variation in a given process and link it to circuit performance.

Process variation in IC fabrication is the deviation from intended or designed values for a structure or circuit parameter of concern. Process variation can result in the fluctuation of parameter values and dimensions in both the structural device and interconnect levels, which can influence performance of ICs. Of particular concern are the effects of structural device and interconnect variations caused by increasing lithography complexity and pattern variation on the performances of ICs in the 32 nm and sub-32 nm logic technologies.

Conventionally, IC designers use embedded devices in a test site of a semiconductor chip. The embedded devices can be tested at a time of qualification as a part of the yield/diagnostic strategy to detect the effects of layout-induced variations. In particular, performance of the embedded devices are measured during the design stages to achieve a better understanding of in-die performance variations resulting from across-chip process variations (ACV) such as photo/etch interactions, chemical mechanical planarization (CMP) dishing and erosion, and other process interactions not observed with typical scribe region measurements. Since ring oscillators oscillate at a frequency dependent on the performance of the devices, these circuits are typically used as the embedded devices to detect structural device and interconnect process variation through measurements of their oscillating frequencies.

Conventional design techniques include measuring the embedded device performance based on an initial ACV at the time of qualification of the semiconductor product, and timing the semiconductor product to meet the worst-case conditions and ACV assumptions to account for the process variations. While this technique is adequate in older technologies such as 90 nm, newer technologies such as 32 nm or less are beginning to show increasing effects of cross die variation due to the increasingly smaller geometry effects and the tolerance of building such devices within these advanced technologies. As such, designers utilize increasingly conservative approaches to provide adequate performance guard band to account for the process variations because, even if a portion of a design may be closer to worst-case performance, another portion of the path may have performance margin due to the ACV. In a similar manner, one area of the chip die may exhibit worst-case process effects, while another section, due to ACV, has performance margin. With these design techniques, designs are timed to meet the worst-case conditions and ACV assumptions, resulting in over-designed paths being integrated into the silicon. This increases costs, complicates fabrication processes, and the faster devices added to close timing increase power.

Accordingly, there exists a need in the art to overcome the deficiencies and limitations described hereinabove.

SUMMARY

In a first aspect of the invention, a method is provided implemented in a computer infrastructure having computer executable code tangibly embodied on a computer readable storage medium having programming instructions operable to set starting across chip variation assumptions using design rules. The programming instructions are further operable to design a test chip and/or product chip using the starting across chip variation assumptions to close timing of the design. The programming instructions are further operable to place devices in the test chip and/or product chip. The programming instructions are further operable to compare performance of the devices within the test chip and/or the product chip to the starting across chip variation assumptions. The programming instructions are further operable to adjust the starting across chip variation assumptions based on the measured performance of the test chip and/or the product chip.

In another aspect of the invention, a method is provided for improving timing of a semiconductor product. The method comprising placing a plurality of embedded devices within a test site and the semiconductor product. The method further comprising generating across chip variation assumptions based on a measured performance of the plurality of embedded devices within the test site. The method further comprising measuring performance of the plurality of embedded devices within the semiconductor product. The method further comprising adjusting the across chip variation assumptions based on the measured performance of the plurality of embedded devices within the semiconductor product. The method further comprising optimizing a design of the semiconductor product and/or a design of a subsequent line of semiconductor products based on the adjusted across chip variation.

In yet another aspect of the invention, a computer program product is provided comprising a computer readable storage medium having readable program code embodied in the storage medium, the computer program product includes at least one component operable to generate across chip variation assumptions based on a measured performance of a plurality of embedded devices within a test site. The at least one component is further operable to measure performance of a plurality of embedded devices within a semiconductor product. The at least one component is further operable to adjust the predicted across chip variation assumptions based on the measured performance of the plurality of embedded devices within the semiconductor product. The at least one component further is operable to optimize a design of the semiconductor product and/or a design of a subsequent line of semiconductor products based on the adjusted across chip variation.

BRIEF DESCRIPTION OF THE SEVERAL VIEWS OF THE DRAWINGS

The present invention is described in the detailed description, which follows, in reference to the noted plurality of drawings by way of non-limiting examples of exemplary embodiments of the present invention.

DETAILED DESCRIPTION

The invention relates to systems and methods for IC fabrication and optimization and, more particularly, to systems and methods for improving timing of new and existing semiconductor products. More specifically, implementations of the invention provide systems and methods for placing devices or functional patterns (e.g., performance ring oscillators (PROs), performance path tests, and/or scan chains) in a test chip and/or a semiconductor product (e.g., an IC chip), and measuring performance of the test chip and/or the semiconductor product using the devices or functional patterns such that the performance of the semiconductor product can be modified at a later time and/or a different level of performance can be committed to for a subsequent semiconductor product.

In embodiments, the devices placed in the test chip and/or the semiconductor product may be PROs that are configured to be probed to determine circuit performance across the test chip and/or semiconductor product at a time of qualification. The PROs can also be used to monitor subsequent changes to the circuit performance during post qualification changes in order to achieve improvements to the semiconductor product or follow on semiconductor product. Advantageously, the performance of the circuits across the test chip and/or the semiconductor product measured at the time of qualification and the subsequent changes to the performance monitored post qualification may be used to adjust ACV assumptions and improve the performance or timing of the existing semiconductor product line and/or improve the performance or timing of a subsequent new or follow-on semiconductor product line.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
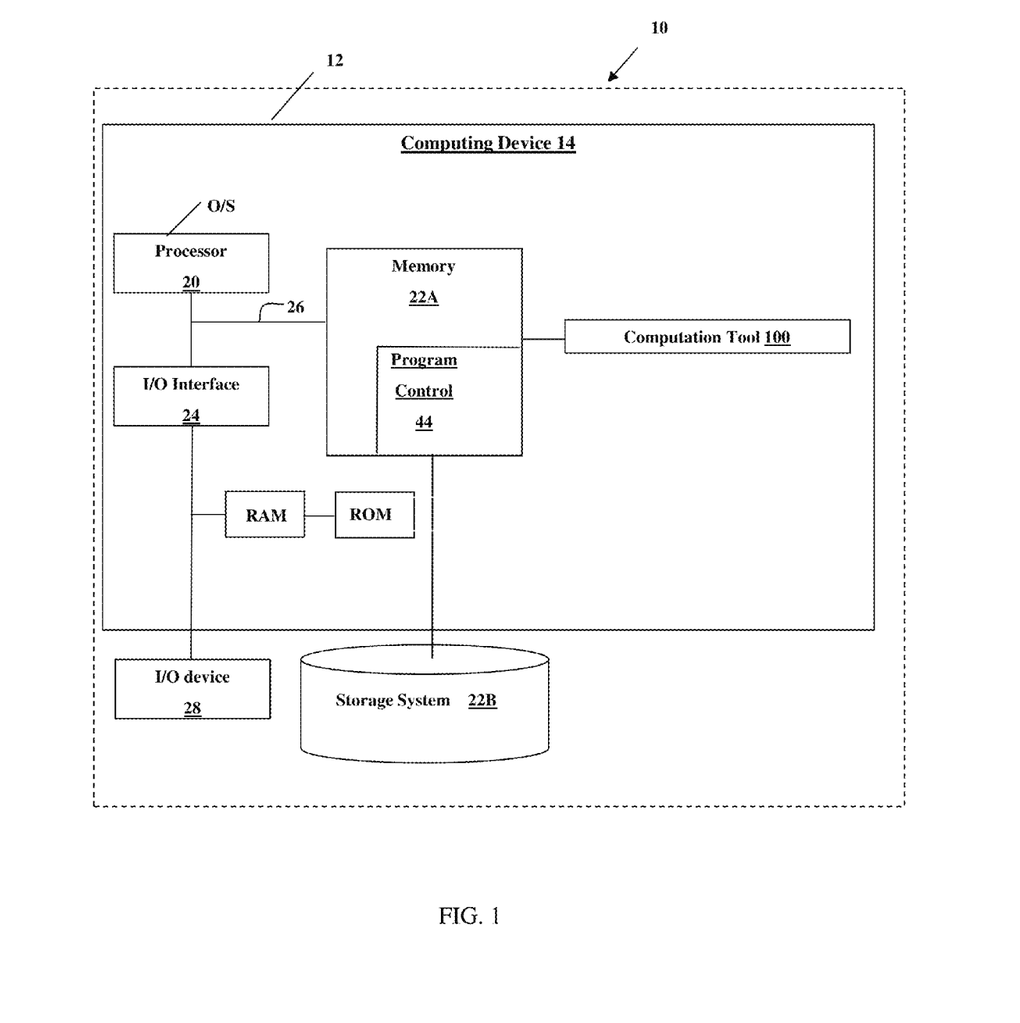
FIG. 1 is an illustrative external environment for implementing the invention in accordance with aspects of the invention.

FIG. 1 shows an illustrative environment 10 for managing the processes in accordance with the invention. To this extent, the environment 10 includes a server or other computing system 12 that can perform the processes described herein. In particular, the server 12 includes a computing device 14. The computing device 14 can be resident on a network infrastructure or computing device of a third party service provider (any of which is generally represented in FIG. 1).

The computing device 14 also includes a processor 20, memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and an operating system (O/S).

The computing device 14 is in communication with the external I/O device/resource 28 and the storage system 22B. For example, the I/O device 28 can comprise any device that enables an individual to interact with the computing device 14 (e.g., user interface) or any device that enables the computing device 14 to communicate with one or more other computing devices using any type of communications link. The external I/O device/resource 28 may be for example, a handheld device, PDA, handset, keyboard etc.

In general, the processor 20 executes computer program code (e.g., program control 44), which can be stored in the memory 22A and/or storage system 22B. Moreover, in accordance with aspects of the invention, the program control 44 controls a computation tool 100, e.g., at least a portion of an electronic design automation (EDA) application or tool, which performs the processes described herein. The computation tool 100 can be implemented as one or more program code in the program control 44 stored in memory 22A as separate or combined modules. Additionally, the computation tool 100 may be implemented as separate dedicated processors or a single or several processors to provide the function of these tools.

In embodiments, the computation tool 100 may be configured to query or measure the performance of embedded devices within a test site and/or a product. In additional embodiments, the computation tool 100 may be further configured to generate ACV assumptions based on the queried or measured performance of the embedded devices, set timing of product designs based on the generated ACV assumptions, adjust the ACV assumptions, and optimize the design of existing or subsequent semiconductor product based on the adjusted ACV, as further discussed herein.

While executing the computer program code, the processor 20 can read and/or write data to/from memory 22A, storage system 22B, and/or I/O interface 24. The program code executes the processes of the invention. The bus 26 provides a communications link between each of the components in the computing device 14.

The computing device 14 can comprise any general purpose computing article of manufacture capable of executing computer program code installed thereon (e.g., a personal computer, server, etc.). However, it is understood that the computing device 14 is only representative of various possible equivalent-computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computing infrastructure 12 is only illustrative of various types of computer infrastructures for implementing the invention. For example, in embodiments, the server 12 comprises two or more computing devices (e.g., a server cluster) that communicate over any type of communications link, such as a network, a shared memory, or the like, to perform the process described herein. Further, while performing the processes described herein, one or more computing devices on the server 12 can communicate with one or more other computing devices external to the server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

Figure 2:
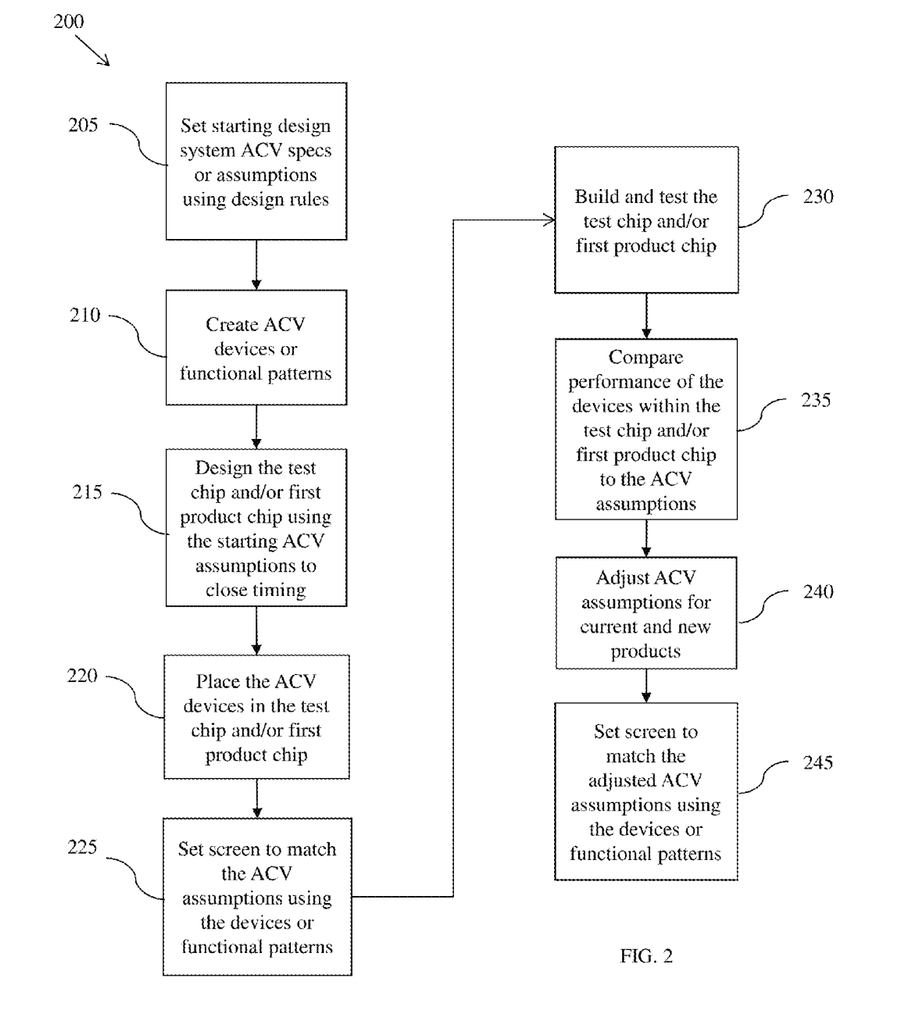
FIGS. 2 and 3 are illustrative process flows for implementing the system in accordance with aspects of the invention.
Figure 3:
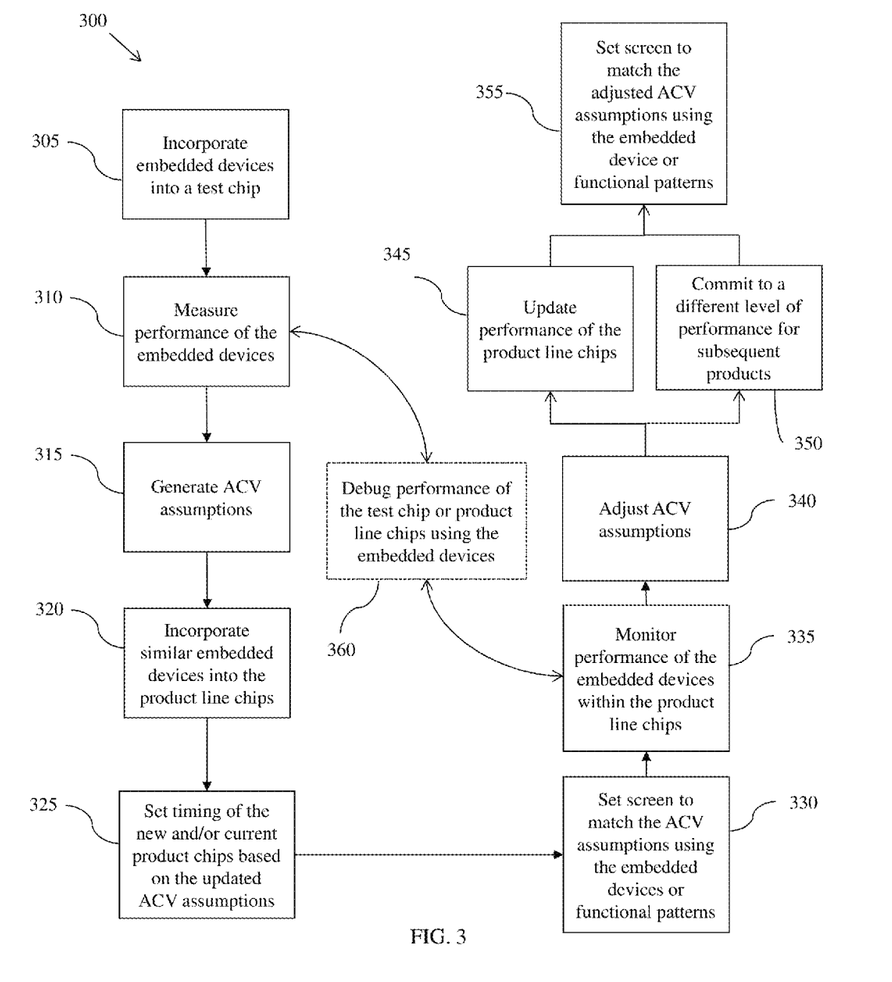

FIGS. 2 and 3 show exemplary flows for performing aspects of the present invention. The steps of FIGS. 2 and 3 may be implemented in the environment of FIG. 1, for example.

The flowcharts and/or block diagrams in FIGS. 2 and 3 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Furthermore, the invention can take the form of a computer program product accessible from a computer-usable or computer-readable medium providing program code for use by or in connection with a computer or any instruction execution system. The software and/or computer program product can be implemented in the environment of FIG. 1. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disc—read/write (CD-R/W) and DVD.

In embodiments, as shown in FIG. 2, a process 200 is provided for placing devices in a test chip and/or a semiconductor product (e.g., an IC chip), and measuring performance of the test chip and/or the semiconductor product using the devices such that the performance of the semiconductor product can be modified at a later time and/or a different level of performance can be committed to for a subsequent semiconductor product. As further discussed herein, the devices may be a predetermined number of PROs placed in different configurations across the chip, e.g., a grid pattern.

At step 205, starting design system ACV specs or assumptions are set using design rules. In embodiments, the starting ACV assumptions are created using technology design rules. These design rules are generated from very early technology test sites and do not represent ACV in a mature manufacturing line. These ACV assumptions generated during the generation of a technology are recorded in the technology rules and are used as a source of comparison if re-analysis or optimization of the product line is required at a later time, and checked to verify that the ACV assumptions actually hold when the ACV assumptions are used as a part of the design of a product.

At step 210, devices or functional patterns (e.g., PROs, performance path tests, and/or scan chains) are designed or created for implementation on a test chip and/or a semiconductor product. The devices are configured to be probed to determine circuit performance across the test chip and/or the semiconductor product (e.g., an ACV monitor). At step 215, the test chip and/or the semiconductor product (e.g., the first product chip) is designed using the starting ACV assumptions to close timing. At step 220, the devices are placed into the design of the test chip and/or the semiconductor product. At step 225, a screen is set to match the starting ACV assumptions using the devices or functional patterns.

At step 230, the test chip and/or the semiconductor product are built and tested with the devices as should be understood by those of ordinary skill in the art. In embodiments, the performance of each of the devices is monitored to obtain an understanding of how the devices behave across each test chip and/or corresponding product line chip. For example, the performance of each device may be measured across each test chip and/or product line chip and mapped to corresponding regions of the test chip and/or product line chip. For example, a relationship may be established between performance of each of the embedded devices (e.g., PROs) and active region performance on the test chip and/or product line chip such that performance gradients across the test chip and/or product line chip summarize the affects of process variables, such as ACV, and process level densities on the performance of circuits within the test chip and/or product line chip. At step 235, performance of the devices within the test chip and/or semiconductor product are compared to the starting ACV assumptions.

At step 240, the starting ACV assumptions generated in step 205 may be adjusted based on the compared performance of the devices within the test chip and/or the semiconductor product to the ACV assumptions. For example, if the starting ACV assumptions are demonstrated based on the measured performances of the devices within the test chip and/or product line chips to present an overly pessimistic performance guard band for the test chip and/or product, then the ACV assumptions may be adjusted such that the performance guard band used to design the product line chips is changed to a less pessimistic standard.

In embodiments, the adjusted ACV assumptions may be implemented to modify the performance (e.g., upgrade or downgrade) of product lines. For example, the adjusted ACV assumptions may be used to set the timing (e.g., faster or slower) of new product fabricated thereafter in the same line and/or be used to commit to a different (e.g., a higher or lower) level of performance for new lines of product (e.g., follow on product).

At step 245, a screen is set in the new product for the same line or the follow on product using the devices or functional patterns to match the new adjusted ACV assumptions as should be understood by those of ordinary skill in the art.

In embodiments, as shown in FIG. 3, a process 300 is provided for placing devices or functional patterns (e.g., embedded devices) in a test chip and/or a semiconductor product (e.g., an IC chip), and measuring performance of the test chip and/or the semiconductor product using the embedded devices such that the performance of the semiconductor product can be modified at a later time and/or a different level of product performance can be committed to for a subsequent semiconductor product. At step 305, the embedded devices (e.g., an ACV monitor) are built into a test chip. The embedded devices may be for example a hard macro placed as a regular structure across the test chip. In embodiments, the hard macro may represent PROs that may be built into the test chip for a new line of semiconductor chips. As discussed herein, a predetermined number of PROs may be built across the test chip in many different configurations, e.g., a grid pattern.

As further shown in step 310 of FIG. 3, the performance of each of the embedded devices is measured to obtain an understanding of how the embedded devices behave across the chip (e.g., ACV). In embodiments, the performance of each of the PROs may be measured across the test chip at the time of qualification and mapped to corresponding regions of the test chip. For example, a relationship may be established between performances of each of the embedded devices (e.g., PROs) and a test site performance such that performance gradients across the test chip summarize the affects of process variables, such as ACV, and process level densities on performance of the circuits within the test chip.

At step 315, ACV assumptions for the product line may be generated based on the measured performances of the embedded devices in the test chip. In embodiments, different performance measurements of key parameters (e.g., frequency) from the multiple instances of the embedded devices on the same test chip are characterized to obtain an understanding or assumption of correlated and uncorrelated ACV components. The ACV assumptions generated in the analysis may be recorded such that the ACV assumptions can be retrieved if re-analysis or optimization of the product line is required at a later time, and checked to verify that the ACV assumptions actually hold when the ACV assumptions are used as a part of the design of the product line chips At step 320, the embedded devices are built into the new line of product (e.g., the semiconductor chip). In embodiments, the embedded devices are substantially similar to those used in the test chip and may be built into the product line semiconductor chips in a similar manner, e.g., placed across the chip in a substantially grid type format. In accordance with aspects of the invention, the embedded devices may be built into every product line chip, a predetermined number of product line chips, or a random number of product line chips such that each product line chip comprising the embedded device is essentially an operating product with multiple test sites.

At step 325, the ACV assumptions generated in step 315 are used to set the timing of the new and/or current product line chips as should be understood by those of ordinary skill in the art. For example, the new and/or current product line chips are designed with a timing that takes into account the ACV assumptions. At step 330, a screen is set to match the ACV assumptions using the embedded devices or functional patterns as should be understood by those of ordinary skill in the art.

At step 335, performance of the embedded devices within the product line chips is monitored. In embodiments, the performance of each of of the embedded devices is monitored to obtain an understanding of how the embedded devices behave across each corresponding product line chip. For example, the performance of each of the PROs may be measured across each product line chip post-qualification of the product line chips and mapped to corresponding regions of the product line chips. For example, a relationship may be established between performance of each of the embedded devices (e.g., PROs) and active region performance on the product line chips such that performance gradients across the product line chips summarize the affects of process variables, such as ACV, and process level densities on the performance of circuits within the product line chips.

At step 340, the ACV assumptions generated in step 315 may be adjusted based on the monitored performance of the embedded devices within the new and/or current product line chips. For example, if the ACV assumptions are demonstrated based on the measured performances of the embedded devices within the product line chips to present an overly pessimistic performance guard band for the product, then the ACV assumptions may be adjusted such that the performance guard band used to design the new and/or current product line chips is changed to a less pessimistic standard.

At step 345, the adjusted ACV assumptions may be implemented to modify (e.g., upgrade or downgrade) the performance of chips from the existing product line. For example, the adjusted ACV assumptions may be used to set the timing of new product line chips fabricated thereafter. At step 350, the adjusted ACV assumptions may be implemented to commit to a different (e.g., a higher or lower) level of performance for new lines of product (e.g., follow on product). For example, the adjusted ACV assumptions may be used to set the timing of subsequent lines of chips designed and fabricated thereafter.

At step 355, a screen is set in the new product line chips or subsequent lines of chips using the embedded devices or functional patterns to match the new adjusted ACV assumptions as should be understood by those of ordinary skill in the art.

Optionally, at step 360, the embedded devices in the test chip and/or product line chips may be used to identify and/or fix performance issues within the chips. For example, if a particular device (e.g., an SRAM) of the test chip or product line chip is not performing or timing correctly, then the embedded device performance within and/or near the area of the chip comprising the particular structure may be compared to embedded device performance within other areas of the chip to trouble shoot or debug the cause of the faulty performance or timing of the particular device.

Figure 4:
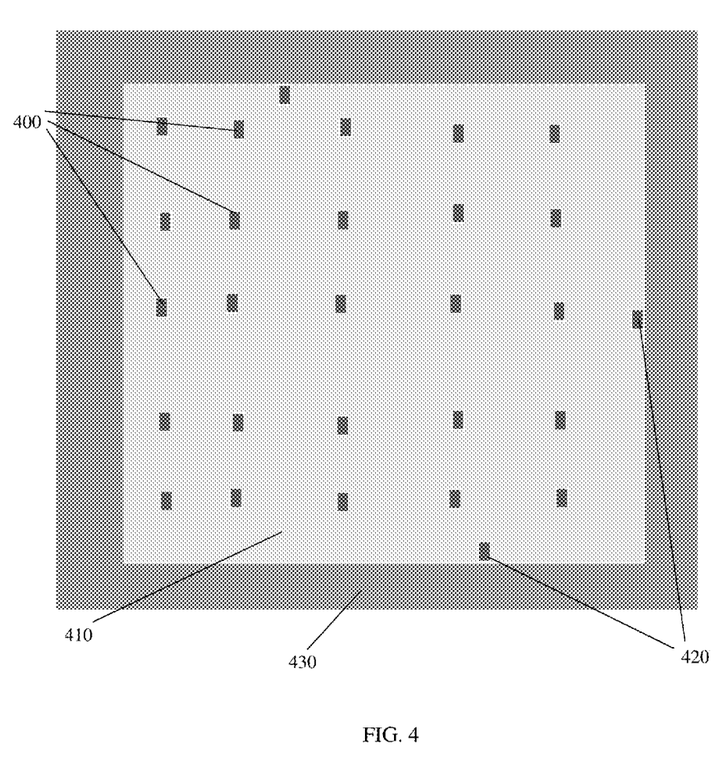
FIG. 4 is an exemplary layout scheme of embedded devices within a semiconductor chip in accordance with aspects of the invention.

As shown in FIG. 4, a predetermined number (e.g., 25) of the PROs 400 may be built across the test chip or semiconductor chip 410 in different configurations. For example, the PROs 400 may be placed across the chip 410 in substantially a grid type format (e.g., with a predetermined periodicity). In embodiments, the layout of the PROs 400 across the chip 410 may also comprise some outlying PROs 420 near the reticle 430 of the chip 410 depending on the placement of active regions of the chip 410.

In embodiments, the PROs may be server based logic designs comprising inverters with a predetermined number (e.g., 51) of stages per ring. The PROs may comprise substantially similar structure or may vary in structure, e.g., a first PRO may comprise nFET half latches and a second PRO may comprise pFET half latches. Each of the PROs on the chips are connected through a design system wrapper that permits querying or probing of each PRO across the chip. For example, each of the PROs is configured to be connectable to the computation tool 100 (as discussed above with respect to FIG. 1) such that the performance of each of the PROs can be measured.

Figure 5:
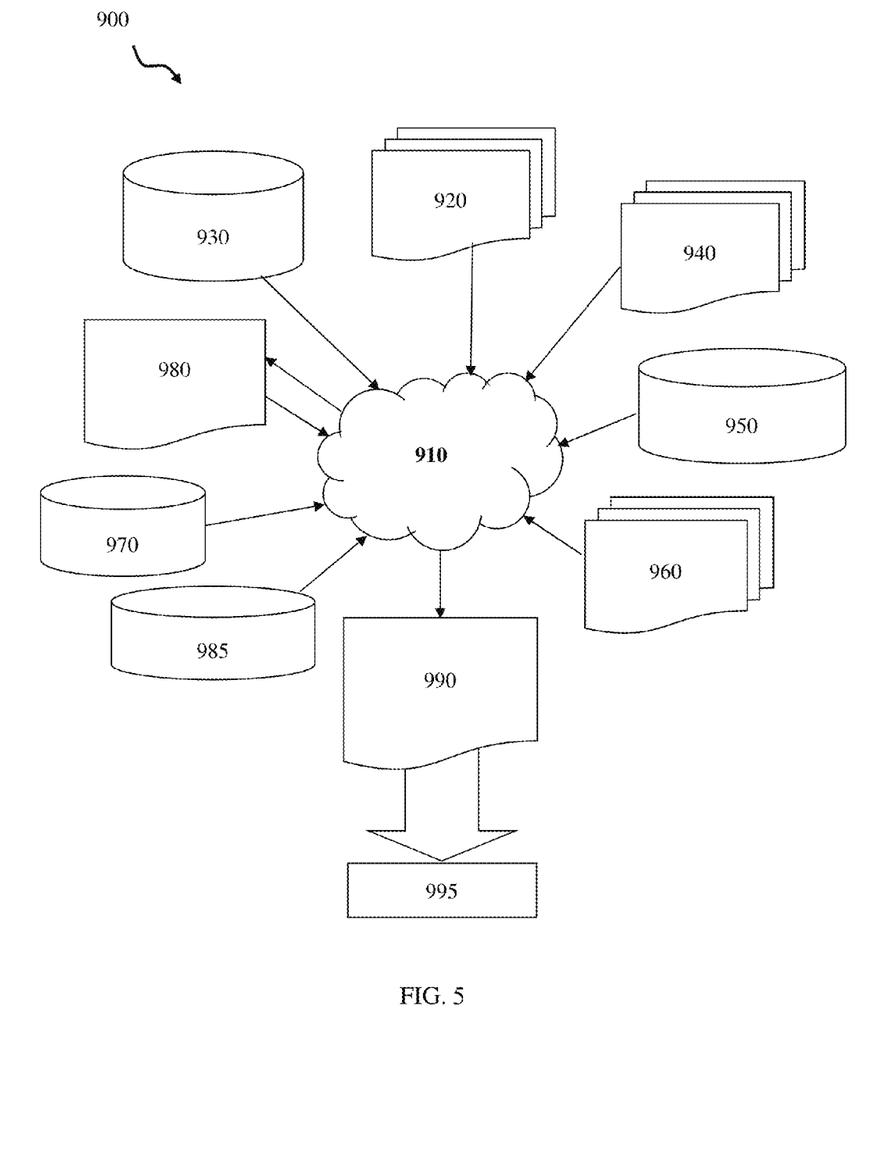
FIG. 5 is a flow diagram of a design process used in semiconductor design, manufacture, and/or test.

FIG. 5 is a flow diagram of a design process used in semiconductor design, manufacture, and/or test used with the system and method of the present invention. FIG. 5 shows a block diagram of an exemplary design flow 900 used for example, in semiconductor IC logic design, simulation, test, layout, and manufacture. Design flow 900 includes processes, machines and/or mechanisms for processing design structures or devices to generate logically or otherwise functionally equivalent representations of the design structures and/or devices. The design structures processed and/or generated by design flow 900 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 900 may vary depending on the type of representation being designed. For example, a design flow 900 for building an application specific IC (ASIC) may differ from a design flow 900 for designing a standard component or from a design flow 900 for instantiating the design into a programmable array, for example a programmable gate array (PGA) or a field programmable gate array (FPGA) offered by Altera® Inc. or Xilinx® Inc.

FIG. 5 illustrates multiple such design structures including an input design structure 920 that is preferably processed by a design process 910. Design structure 920 may be a logical simulation design structure generated and processed by design process 910 to produce a logically equivalent functional representation of a hardware device. Design structure 920 may also or alternatively comprise data and/or program instructions that when processed by design process 910, generate a functional representation of the physical structure of a hardware device. Whether representing functional and/or structural design features, design structure 920 may be generated using electronic computer-aided design (ECAD) such as implemented by a core developer/designer. When encoded on a machine-readable data transmission, gate array, or storage medium, design structure 920 may be accessed and processed by one or more hardware and/or software modules within design process 910 to simulate or otherwise functionally represent an electronic component, circuit, electronic or logic module, apparatus, device, or system, which can be implemented with the method and system of the present invention. As such, design structure 920 may comprise files or other data structures including human and/or machine-readable source code, compiled structures, and computer-executable code structures that when processed by a design or simulation data processing system functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 910 preferably employs and incorporates hardware and/or software modules for synthesizing, translating, or otherwise processing a design/simulation functional equivalent of the components, circuits, devices, or logic structures to generate a netlist 980 which may contain design structures such as design structure 920. Netlist 980 may comprise, for example, compiled or otherwise processed data structures representing a list of wires, discrete components, logic gates, control circuits, I/O devices, models, etc. that describes the connections to other elements and circuits in an integrated circuit design. Netlist 980 may be synthesized using an iterative process in which netlist 980 is resynthesized one or more times depending on design specifications and parameters for the device. As with other design structure types described herein, netlist 980 may be recorded on a machine-readable data storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, buffer space, or electrically or optically conductive devices and materials on which data packets may be transmitted and intermediately stored via the Internet, or other networking suitable means.

Design process 910 may include hardware and software modules for processing a variety of input data structure types including netlist 980. Such data structure types may reside, for example, within library elements 930 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 940, characterization data 950, verification data 960, design rules 970, and test data files 985 that may include input test patterns, output test results, and other testing information. Design process 910 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 910 without deviating from the scope and spirit of the invention. Design process 910 may also include modules for performing standard circuit design processes such as timing analysis, verification, design rule checking, place and route operations, etc.

Design process 910 employs and incorporates logic and physical design tools such as HDL compilers and simulation model build tools to process design structure 920 together with some or all of the depicted supporting data structures along with any additional mechanical design or data (if applicable), to generate a second design structure 990.

Design structure 990 resides on a storage medium or programmable gate array in a data format used for the exchange of data of mechanical devices and structures (e.g. information stored in an IGES, DXF, Parasolid XT, JT, DRG, or any other suitable format for storing or rendering such mechanical design structures). Similar to design structure 920, design structure 990 preferably comprises one or more files, data structures, or other computer-encoded data or instructions that reside on transmission or data storage media and that when processed by an ECAD system generate a logically or otherwise functionally equivalent form of one or more devices. In one embodiment, design structure 990 may comprise a compiled, executable HDL simulation model that functionally simulates the devices.

Design structure 990 may also employ a data format used for the exchange of layout data of integrated circuits and/or symbolic data format (e.g. information stored in a GDSII (GDS2), GL1, OASIS, map files, or any other suitable format for storing such design data structures). Design structure 990 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure. Design structure 990 may then proceed to a stage 995 where, for example, design structure 990: proceeds to tape-out, is released to manufacturing, is released to a mask house, is sent to another design house, is sent back to the customer, etc.

The method as described above is used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed :

1. A method implemented in a computer infrastructure having computer executable code tangibly embodied on a computer readable storage medium having programming instructions operable to:
set starting across chip variation assumptions using design rules;
design a test chip and/or product chip using the starting across chip variation assumptions to close timing of the design;
place a predetermined number of devices spanning from one side of the test chip and/or product chip to another side of the test chip and/or product chip in one or more configurations;
measure a performance of each of the devices to obtain an understanding of how the devices are performing across the test chip and/or product chip;

map the performance of each of the devices to corresponding regions of the test chip and/or product chip;
establish a relationship between the measured performance of each device and each corresponding region of the test chip and/or product chip to generate performance gradients across the test chip and/or product chip that summarize affects of process variation and process level densities on performance of circuits within the test chip and/or product chip:
compare the generated performance gradients across the test chip and/or the product chip to the starting across chip variation assumptions to determine whether the starting across chip variation assumptions present a pessimistic or optimistic guard band; and
adjust the starting across chip variation assumptions based on the comparison between the generated performance gradients and the starting across chip variation assumptions such that adjusted across chip variation assumptions present a more precise guard band,
wherein at least the step of designing the test chip and/or the product chip is performed using a processor of the computer infrastructure.

2. The method of claim 1, wherein the programming instructions are further operable to build and test the test chip and/or the product chip prior to the comparing the performance of the devices within the test chip and/or the product chip.

3. The method of claim 2, wherein the programming instructions are further operable to set a first screen for the test chip and/or the product chip to match the starting across chip variation assumptions prior to the building the test chip and/or the product chip.

4. The method of claim 3, wherein the programming instructions are further operable to set a second screen for the test chip and/or the product chip to match the adjusted across chip variation assumptions.

5. The method of claim 4, wherein the devices are configured to be probed to determine circuit performance across the test chip and/or the product chip.

6. The method of claim 5, wherein the devices are a plurality of embedded devices placed in a grid across the test chip and/or the product chip.

7. The method of claim 6, wherein the devices are performance ring oscillators.

8. A method for improving timing of a semiconductor product, the method comprising:
placing a plurality of embedded devices spanning from one side of a test chip and the semiconductor product to another side of the test chip and the semiconductor product in one or more configurations;
measuring a performance of each of the devices to obtain an understanding of how the devices are performing across the test chip:
mapping the performance of each of the devices to corresponding regions of the the test chip:
establishing a relationship between the measured performance of each device and each corresponding region of the test chip to generate performance gradients across the test chip that summarize affects of process variation and process level densities on performance of the test chip:
generating across chip variation assumptions based on the performance gradients across the test chip;
measuring performance of the plurality of embedded devices within the semiconductor product;
adjusting the across chip variation assumptions based on the measured performance of the plurality of embedded devices within the semiconductor product; and
optimizing a design of the semiconductor product and/or a design of a subsequent line of semiconductor products based on the adjusted across chip variation,
wherein at least the step of adjusting the across chip variation assumptions is performed using a processor.

9. The method of claim 8, further comprising setting timing of the semiconductor product based on the generated across chip variation assumptions.

10. The method of claim 8, wherein the plurality of embedded devices are a plurality of performance ring oscillators.

11. The method of claim 10, wherein the plurality of performance ring oscillators are placed in a grid across the test chip and the semiconductor product.

12. The method of claim 8, wherein the measuring the performance of the plurality of embedded devices within the semiconductor product comprises establishing a relationship between the performance of the plurality of embedded devices and active region performance on the semiconductor product at a time subsequent to qualification of the semiconductor product such that performance gradients across the semiconductor product summarize affects of across chip variation on performance of circuits within the semiconductor product.

13. The method of claim 8, further comprising identifying performance issues within the test chip or the semiconductor product based on the measured performance of the plurality of embedded devices within the test chip or the semiconductor product respectively.

14. A computer program product comprising a computer readable storage memory or device having readable program code embodied in the storage memory or device, wherein the computer readable storage medium is not a transitory signal per se, the computer program product includes at least one component operable to:
place a plurality of embedded devices spanning from one side of a test chip to another side of the test chip in one or more configurations:
measure a performance of each of the devices to obtain an understanding of how the devices are performing across the test chip;
map the performance of each of the devices to corresponding regions of the the test chip:
establish a relationship between the measured performance of each device and each corresponding region of the test chip to generate performance gradients across the test chip that summarize affects of process variation and process level densities on performance of the test chip;
generate across chip variation assumptions based on the performance gradients across the test chip;
measure performance of a plurality of embedded devices within a semiconductor product;
adjust the across chip variation assumptions based on the measured performance of the plurality of embedded devices within the semiconductor product; and
optimize a design of the semiconductor product and/or a design of a subsequent line of semiconductor products based on the adjusted across chip variation.

15. The computer program product of claim 14, wherein the at least one component is further operable to set timing of the semiconductor product based on the generated across chip variation assumptions.

16. The computer program product of claim 14, wherein the plurality of embedded devices are a plurality of performance ring oscillators.

17. The computer program product of claim 16, wherein the plurality of performance ring oscillators are placed in a grid across the test chip and the semiconductor product.

18. The computer program product of claim 14, wherein the measuring the performance of the plurality of embedded devices within the semiconductor product comprises establishing a relationship between the performance of the plurality of embedded devices and active region performance on the semiconductor product at a time subsequent to qualification of the semiconductor product such that performance gradients across the semiconductor product summarize affects of across chip variation on performance of circuits within the semiconductor product.

19. The computer program product of claim 14, wherein the at least one component is further operable to identify performance issues within the test chip or the semiconductor product based on the measured performance of the plurality of embedded devices within the test chip or the semiconductor product respectively.

20. The method of claim 1, wherein the programming instructions are further operable to modify performance of the product chip by setting timing of the product chip based on the adjusted starting across chip variation assumptions.

* * * * *